Sept. 15, 1931. W. H. NOELTING 1,822,998
ANTIFRICTION CASTER WHEEL AND SUPPORT
Filed July 17, 1929
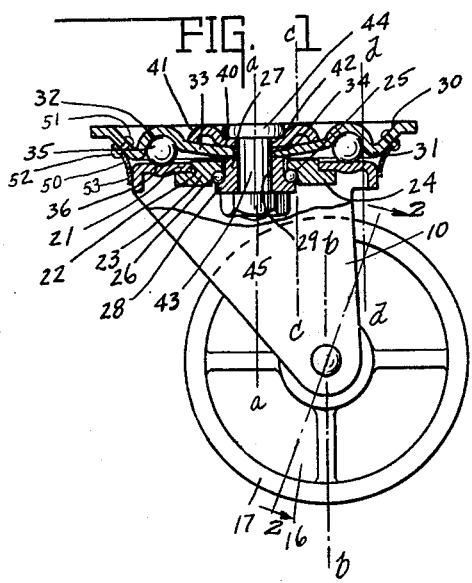
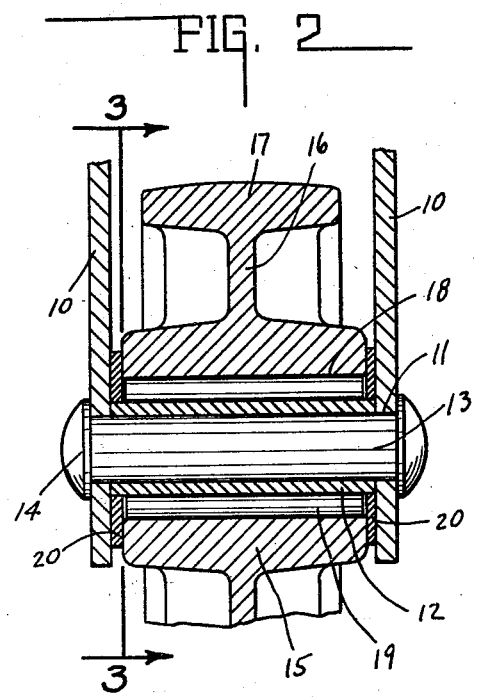
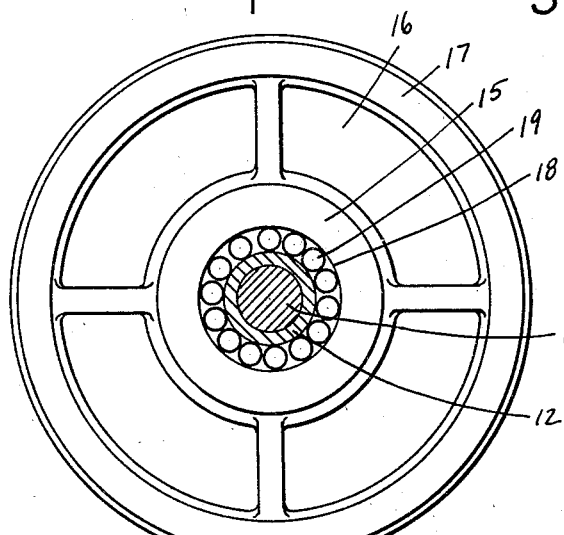
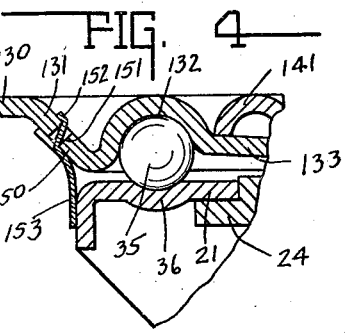
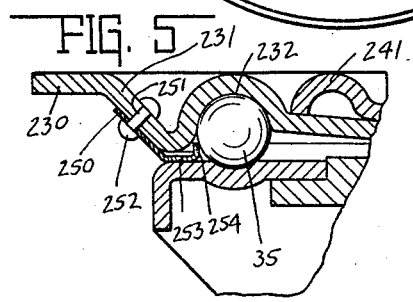
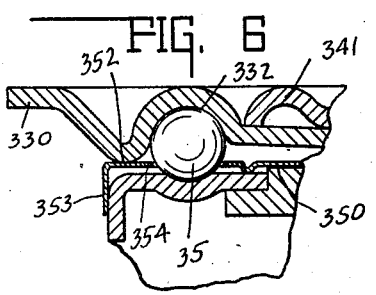
INVENTOR.
WILLIAM H. NOELTING.
BY
ATTORNEYS.

Patented Sept. 15, 1931

1,822,998

UNITED STATES PATENT OFFICE

WILLIAM H. NOELTING, OF EVANSVILLE, INDIANA, ASSIGNOR TO FAULTLESS CASTER COMPANY, OF EVANSVILLE, INDIANA, A CORPORATION

ANTIFRICTION CASTER WHEEL AND SUPPORT

Application filed July 17, 1929. Serial No. 379,011.

This invention relates to a heavy duty, substantially anti-friction, swivel caster construction.

The chief object of this invention is to produce a caster which is capable of carrying extremely heavy loads with a minimum of friction and which is so constructed that cocking under sudden shock is substantially prevented.

Another object of the invention is to reduce the friction of the several parts to a minimum by utilizing anti-friction elements in association with case hardened surfaces engaged thereby.

Another feature of the invention consists in the multiple ball race anti-friction construction wherein the several ball races are coaxially arranged but are concentric relative to their trackways and said trackways lie in substantially parallel planes.

The full nature of the invention will be understood from the accompanying drawings and the following description and claims.

In the drawings Fig. 1 is a side elevational view of one form of caster embodying the invention, parts being broken away to show other parts in central section and in elevation. Fig. 2 is an enlarged central sectional view taken on the line 2—2 of Fig. 1 in the direction of the arrows. Fig. 3 is a vertical sectional view taken on the line 3—3 of Fig. 2 and in the direction of the arrows. Fig. 4 is an enlarged sectional view similar to the sectional portion of Fig. 1 and of a modified form of the invention. Fig. 5 is a view similar to Fig. 4 in a still further modified form of the invention. Fig. 6 is a sectional view similar to Figs. 4 and 5 and of a still further modified form of the invention.

In the drawings 10 indicates a pair of yoke-forming ears of a caster construction, each of which is apertured as at 11, said ears having said apertures in alignment. Coaxial with said apertures and interposed between said ears is a cylindrical sleeve 12, the outer surface of which is preferably case hardened. A suitable rivet 13 having the enlargements 14 or the equivalent rigidly unites the two apertured ends of the ears and the sleeve in rigid axle-forming relation with an annular case hardened cylindrical surface.

The caster wheel includes the hub portion 15, the web portion 16 and the tread portion 17. The hub portion includes a central aperture 18 of considerably greater diameter than the exterior of the hardened sleeve or bushing, the latter preferably being of seamless tubing. Interposed in the annular space provided therebetween are a plurality of rollers 19. Said rollers are retained within the apertures by engaging the roller-retaining washers 20 interposed between the hub and the adjacent ear of the yoke. These washers may be hardened if desired.

The modified construction of the aforesaid is to have the aperture in the washer 20 of the same size as the aperture 11 in the ear, and instead of having the case hardened sleeve 12 seat in the washer 20 as illustrated, said sleeve may abut said washer and be rigidly clamped between the sleeve and the ear in the formation of the rigid axle construction. When thus fashioned a slight clearance should be provided between the hub of the wheel and the fixed washer.

Each ear of the yoke extends upwardly and terminates in a centrally and horizontally disposed plate 21, centrally apertured as at 22 to receive an annular offset step type hardened ball race forming bushing 23 having the offset portion 24 and the race portion 25. Mounted in said race portion 25 is the lower series of balls 26 retained in position by the laterally flanged hardened spacing bushing 27 having the ball retaining flange 28 and the central aperture 29. The first bushing is mounted with a press fit in the plate aperture. The second bushing is swiveled thereon by means of the first series of balls just described.

A top or top plate 30, which may be of any desired form and may be provided with any apertured arrangement suitable for anchorage, is provided with an annular depending flange portion 31 that merges into a semicircular cross section annular ball race trackway 32. The inner edge of said trackway-forming portion extends inwardly as at 33 and is apertured as at 34. The balls 35 are retained by the trackway in race formation and said plate is preferably hardened to reduce the friction. The balls ride upon an annularly depressed portion 36 formed in the yoke plate 21.

Since this caster is designed for heavy duty with a minimum of friction, the top plate is reenforced by an annular corrugated stiffening washer 40 having the corrugation 41. Said plate 40 is apertured as at 42. The bushing 27, the top plate 30, the corrugated washer 40 all are in superposed abutting relation with their apertures registering and extending through the same is the stem, rivet or king pin 43 having the head portion 44 seated in the recess formed in the corrugated washer by the corrugation thereof. A nut 45 or equivalent enlargement at the opposite end of the stem or pin clampingly associates the corrugated washer, the top plate and the race-forming bushing together as a unit. The enlargement 44 of the stem is nested in the corrugated washer and the corrugated washer and enlargement are both nested in the central recessed portion of the top plate. Said washer may, if desired, be hardened and, as before mentioned, the top plate may likewise be hardened, as well as the horn track plate washer 24.

The aforesaid arrangement is such that the stem or king pin, while relatively short, has but little tendency to cock out of position and yet the construction is such that extremely heavy loads can be accommodated with a minimum of friction.

The resulting construction is one of relatively great simplicity and one that has withstood the roughest abuse and yet retained its functional stability.

In Fig. 1 the top of load-supporting plate 30 is shown supporting a depending skirt or dust ring 50 having a portion 53 for rotatably engaging the central portion of the caster yoke or horn. A dust ring is mounted by means of the rivets 52 which extend through registering apertures 51 in the dust ring and the load-supporting plate, see Fig. 1.

Another modification thereof is illustrated in Fig. 4 wherein the dust ring 150 has the horn-engaging portion 153 and instead of being riveted or spot-welded to the load-supporting plate of the caster the dust ring has formed from it the tongue 152 that extends angularly through the opening 151 provided therefor in the inclined portion 131 of the load-supporting plate. The free end of the tongue 152 is turned angularly for anchorage of the skirt.

In Fig. 5 is still a further modified form of the dust ring invention wherein the body portion 250 is mounted by the rivets 252, as heretofore described relative to Fig. 1, or may be mounted by the method shown in Fig. 4. However, in this form of the invention the horn-engaging portion for sealing the space between the horn and the plate is a horizontal portion 253 instead of the vertical portions such as previously set forth and as illustrated in Figs. 1 and 4. The free end of the inwardly and horizontally directed portion 253 is turned upwardly for ball association.

In Fig. 6 a modified form of the dust ring construction is disclosed and this form of the invention is a further departure of that shown in Fig. 5 wherein the dust ring has an operative association with the balls. In this form of the invention the dust ring is carried by being rigidly mounted with the load-supporting plate and the stem and extends radially outward and is suitably apertured as at 354 to receive a ball 35 of the caster. The plate 350, therefore, in this instance, serves as a ball retainer or spacer and the outer free end is turned downwardly as at 352 for relative engagement with the horn while the upper horizontal portion as at 352 bears upon a lower portion of the load-supporting plate. Thus the ball race is sealed as heretofore provided and the balls are maintained in spaced relation by such combination dust ring construction.

In Fig. 1, the two possible parallel planes, including the swivel axis and the wheel axis offset therefrom, are indicated by lines therein and by the designations "$a—a$" and "$b—b$" respectively. The plane parallel thereto and nearest the wheel axis, and including the tangent to the inner and lower as well as smaller anti-friction construction, is indicated by a line designated as "$c—c$". The plane parallel to said planes and nearest the wheel axis plane and including the tangent to the upper, outer and larger anti-friction construction, is illustrated by a line designated by "$d—d$."

The invention claimed is:

1. An anti-friction caster including a load-supporting plate including an inner depressed portion and an annular skirt concentric therewith and forming an annular raceway therebetween, an annularly corrugated washer nested in the depressed portion and having an angularly directed portion bearing angularly on said depressed portion, and a headed pin extending through the plate and washer with its head portion nested within the corrugation defined portion of the washer.

2. An anti-friction caster comprising a centrally apertured horn forming track plate, a centrally apertured and offset ball race bushing mounted therein, an annular series of balls therefor, and a combination spacing and ball retaining bushing in said first mentioned bushing.

3. An anti-friction caster including a load-supporting plate having an inner depressed portion and an annular skirt forming an annular raceway therebetween, an annularly corrugated washer nested in the depressed portion and having an annularly directed portion bearable thereon, a centrally apertured horn forming track plate, a centrally apertured and offset ball race forming bushing therein, an annular series of balls interposed between said load-supporting plate and said horn plate, another series of balls for engaging the ball race bushing, a combination spacing and ball retaining bushing in said bushing aperture for the second series of balls, and a headed pin for securing said last-mentioned bushing in retaining relation and having a headed portion nested within the portion of the washer defined by the corrugation.

In witness whereof, I have hereunto affixed my signature.

WILLIAM H. NOELTING.